United States Patent [19]

Malinski et al.

[11] 4,031,941

[45] June 28, 1977

[54] CONCENTRIC CONTRA-ROTATING BEAD DEFLECTOR MECHANISM FOR TIRE MOUNTING APPARATUS

[75] Inventors: S. W. Malinski, Tamaroa, Ill.; Thomas L. Mueller, St. Louis, Mo.

[73] Assignee: S. W. Malinski, Tamaroa, Ill.

[22] Filed: Feb. 17, 1976

[21] Appl. No.: 658,600

[52] U.S. Cl. .............................. 157/1.17; 157/1.24
[51] Int. Cl.² .................................... B60C 25/06
[58] Field of Search .......................... 157/1.17, 1.24

[56] References Cited

UNITED STATES PATENTS

| | | | |
|---|---|---|---|
| 3,489,198 | 1/1976 | Malinski | 157/1.17 |
| 3,612,140 | 10/1971 | Malinski | 157/1.17 |
| 3,847,198 | 11/1974 | Brosene, Jr. | 157/1.24 |

*Primary Examiner*—James L. Jones, Jr.
*Assistant Examiner*—James G. Smith

[57] ABSTRACT

In that type of apparatus for mounting large size off-highway pneumatic tires on drop-center rims, in which two bead deflectors are moved simultaneously in opposite senses along semi-circular paths, the deflector arms are mounted on the upper ends of concentric shafts having gears at their lower ends, the inner shaft projecting below the outer shaft, each being engaged by an inward facing rack member positioned at suitable height. The two rack members are driven together by a linear actuator whose thrust is reacted through bushings mounted on the shafts above and below the gears. Hence the actuator force which turns the arms imposes no bending moment on the vertical sleeve or platform structure.

8 Claims, 5 Drawing Figures

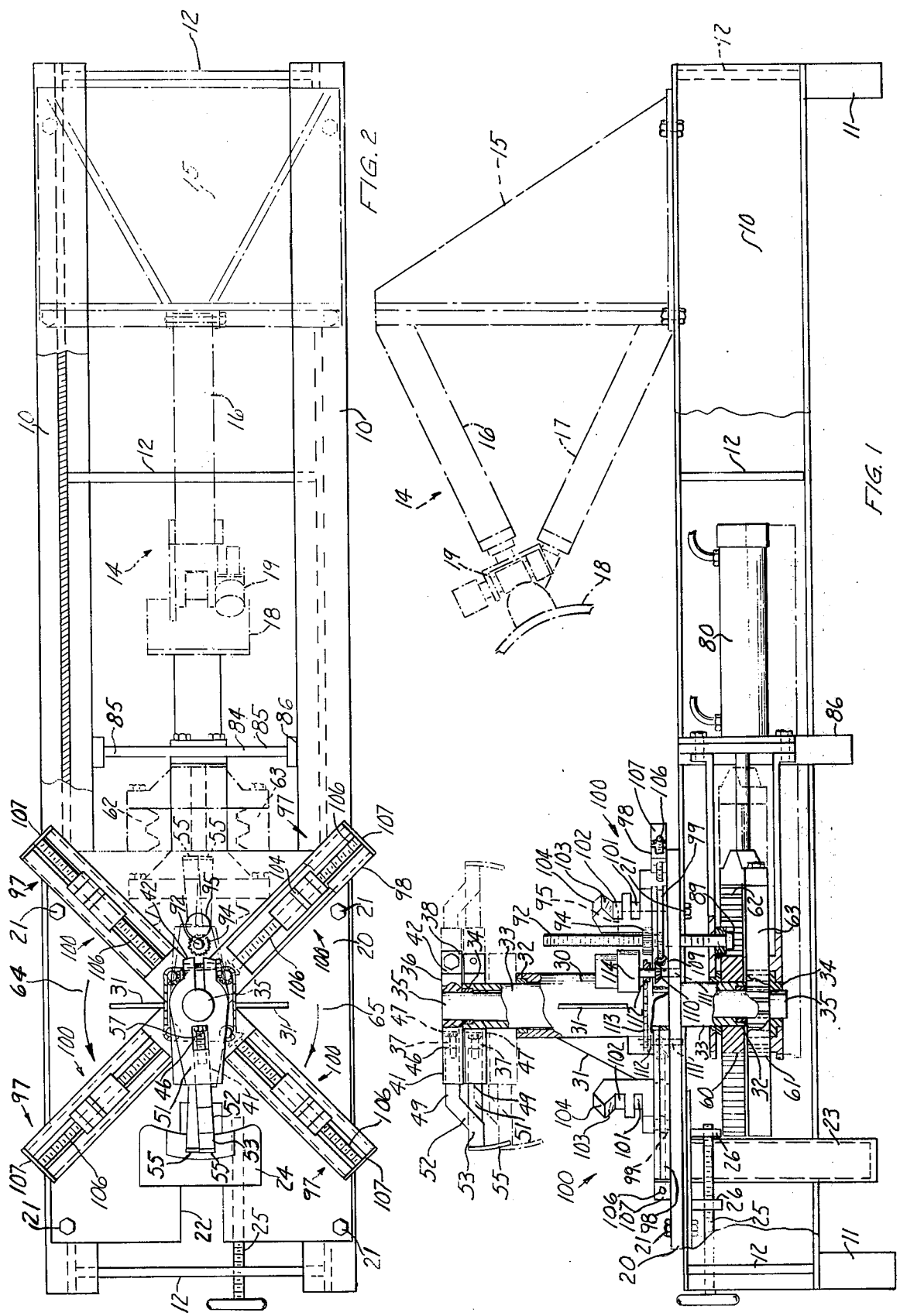

CONCENTRIC CONTRA-ROTATING BEAD DEFLECTOR MECHANISM FOR TIRE MOUNTING APPARATUS

BACKGROUND OF THE INVENTION

Large size pneumatic tires, ordinarily referred to as "off-highway tires", are usually mounted on substantially cylindrical wheel rims having one fixed flange and one removable flange. Prior to the present invention, however, a process and apparatus were developed as shown in U.S. Pat. Nos. 3,489,198 and 3,612,140, which made it feasible to utilize tires and rims of the drop-center type.

This prior apparatus uses a rim support which holds the lower flange of a rim by clamps; a tire is positioned with a portion of its bead inserted below the upper rim flange; and an external thrust-applying mechanism, spaced from the rim support platform, drives this portion of the bead into the drop center of the rim. Adjacent to the center of the rim support platform are two side-by-side vertical shafts whose lower ends have gears between which a two-sided rack moves linearly, to rotate the shafts simultaneously in opposite senses. This lower end mechanism is fixed in its vertical position. Secured to splined upper ends of the vertical shafts are rotating bead-deflector arms. The splines permit setting the arms at heights corresponding to the height of the upper flange of the rim above the platform, to accommodate variations in the width of the rims.

Since the shafts of this prior art apparatus are not at the geometric center of the arm, the arms which carry the bead deflectors are designed to telescope, with their inner surfaces riding around against the outer edge of the upper rim flange. The resulting friction increases the power required.

SUMMARY OF THE INVENTION

The objects of the present invention include providing improved apparatus in which the vertical shafts are concentric, so that the arms carrying the bead deflectors may be fixed at such length as to turn clear of the rim and rigidly resist inward compressive forces without friction. Another purpose is to provide simple lower end gearing on these concentric shafts, with a linear actuator driving the gearing in opposite senses at the same angular rate regardless of differences in resistance encountered by the two bead deflectors. A further purpose is to resist the force of the linear actuator without applying any bending force to the platform structure. An additional purpose is to permit easy removal of a tire from a wheel, and thereafter, on positioning the bead deflectors, to quickly adjust the plane in which they are to be rotated. A still further purpose is to provide sure concentric clamping for a variety of rim diameters.

I achieve these purposes, and others which will be apparent from the detailed specification which follows, by the structure and mechanism hereafter described. Summarizing generally and without limitation, I provide, at the center of a platform, a fixed vertical sleeve in which is adjustably supported an assembly including an outer tubular shaft and a central shaft, each projecting both above and below the members outward of it. Rigid radial arms secured to the upper ends of these shafts are of adjustable length and have vertical offsets; their outer ends carry bead deflectors which operate in the same plane. The arms are moved in opposite arcuate paths by the opposed rotation of vertically-adjacent gears secured to their lower ends.

Above the gear on the outer shaft is an upper bushing; below the gear on the central shaft is a similar bushing. These mount the upper and lower plate members of a mechanism-support frame which includes an end member connecting the upper and lower plate members. The end member supports a front-mounted hydraulic cylinder. The piston of this cylinder drives a diagonal cross member on whose ends are mounted two opposed, inward facing racks, specifically, an upper rack presented against the gear on the outer shaft and a lower rack presented to engage the gear on the inner central shaft. As the piston drives the racks along the gears, applying not only rotative but linear forces, the cylinder is pressed in the opposite direction, applying through the upper and lower support frame portions reactive forces on the bushings on the shafts. Thus no bending moment is applied at the platform sleeve. The platform structure therefore requires only simple enforcements, leaving room for mechanisms which adjust the height of the radial arms and which clamp the rim.

Four clamp shoes are moved by screws in diagonal radial tracks, to clamp a wheel or rim in central position. The screws are powered at their inner ends by bevel gears and a chain-and-sprocket power drive.

The height of the radial arms is adjusted by raising or lowering the entire assembly consisting of the concentric shafts and the gears, racks and cylinder mechanism which has been described. This assembly is raised or lowered with a power-driven screw forwardly of the platform sleeve; its lower end turns in a bushing in the mechanism-support frame.

Since the entire assembly would turn if either shaft encountered more torque resistance than the other, a restraint against angular movement is provided.

BRIEF DESCRIPTION OF THE DRAWINGS

FIG. 1 is a side elevation, partly broken away, showing a tire mounting machine embodying the present invention, with its rotating arm mechanism in fully rotated position. Phantom lines show the original position prior to rotation, and also show a lowered position of the contra-rotating arm mechanism, as well as a thrust-applying mechanism at the right of the drawing.

FIG. 2 is a plan view corresponding to FIG. 1.

DESCRIPTION OF THE PREFERRED EMBODIMENT

Figure 4:
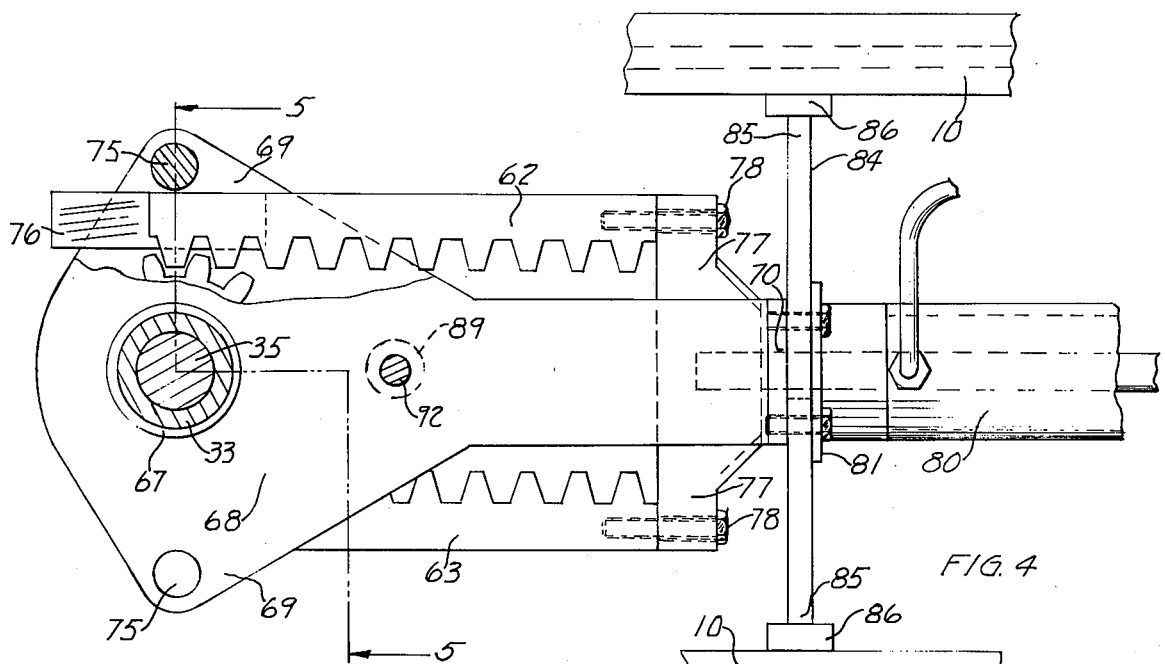
FIG. 4 is a plan view corresponding to FIG. 3.

In the preferred embodiment, referring to FIGS. 1 and 2, I construct a support frame of two deep parallel longitudinal I-beams 10 supported at their ends by legs 11. Similar intermediate legs, not shown, may be provided at convenient spacings to support the beams 10. At convenient intervals transverse webs 12 are also provided. At the forward end, shown in the right side of FIGS. 1 and 2, attached onto the upper flange of the beams 10 by suitable bolts is a hydraulic thrust-applying mechanism, not part of the present invention and used in a manner analogous to that of U.S. Pat. Nos. 3,489,198 and 3,612,140. This thrust applying mechanism, generally designated 14, includes a reactionresisting structure 15 which is bolted onto the I-beams 10, and supports, in a central vertical plane, upper and lower hydraulic cylinders 16, 17 triangulated to exert their thrust at a common transverse axis. A thrust-applying shoe 18 is adjusted pivotally about said axis by a hydraulic motor 19, so that it can exert its thrust in line with either cylinder 16, 17 or at intermediate angles.

The present invention serves as a substitute and improvement for the contra-rotating tire mounting mechanism shown in said U.S. Patents. A heavy rectangular horizontal platform plate 20 is mounted on the upper flanges of the I-beams 10 by four heavy bolts 21. The rear edge of the platform plate 20 has a parallel-sided, forward-extending notch 22 accommodating a vertical telescoping jack 23 whose pressure-applying shoe 24 rests on top of the plate 22 when in retracted position. This jack is utilized to demount tires, preferably in the manner described in said U.S. Patents. The radial position of the telescoping cylinder 23 in the notch 22 is adjusted by a wheel-operated screw 25, turning in threaded lugs 26 which extend downward from the platform 20.

Rising from the center of the platform 20 is a fixed central sleeve 30 which serves as a vertical bushing. It is supported on both sides and at the rear by diagonal gusset plates 31 extending to the upper surface of the platform plate 20. The upper and lower ends of the sleeve 30 are counterbored, as seen in FIG. 2, to receive inset annular bronze bushings 32, which permit both rotation and axial sliding. The counter-rotating mechanism is vertically adjustable within the sleeve 30 as a unit. This will now be described.

Within the sleeve 30 is an outer tubular shaft 33 whose upper end projects beyond the upper end of the sleeve 30 and whose lower end projects downwardly to a depth well below the platform 20. Annular bearings 34 within its upper and lower ends provide for rotation of a central shaft 35 whose upper and lower ends project beyond those of the outer shaft 33.

Securely mounted onto the outer shaft 33 about its upper end is a heavy lower inner arm 36 having a square-cut radial socket 37. Its hub portion opposite to its radial socket 37 is slotted and has heavy lugs 38 by which it is clamped onto the outer shaft 33. A similar upper inner arm 40 has a similar square-cut radial socket 41, and its hub is likewise held by clamping lugs 42 on the upper end of the central shaft 35. Except for the sizing of their hubs to accommodate the shafts 33, 35, the inner arms 36, 40 may be identical. The socket of each has near its inner end an upper surface window 46. At the inner end of each socket is an outward-facing abutment wall 47.

Fitted slidably within the sockets 37, 41 are the inner portions 49 of lower and upper outer telescoping arms 51, 52. The upper arm 52 has near its outer end a diagonally downward offset, to bring its outer end 53 to the same plane as that of the lower outer arm 51. The outer ends of these arms 51, 52 are equipped with downward extending, inward-curved bead deflector shoes 55.

The radial position of the bead deflector shoes 55 from center is adjusted by increasing or decreasing the projecting length of heavy bolts 57, threaded into the inner end faces of the inner telescoping arm portions 49. These bolts are accessible through the windows 46 in the lower and upper arm socket portions 37, 41. In use, when the telescoping arms 51, 52 are pressed inward, the bolts 57 transmit the compressive forces to the outward-facing abutment walls 47 of the inner arms 36, 40 to be reacted through the shafts 33, 35 and by the platform sleeve 30.

Reference will now be made to the mechanism by which the outer shaft 33 and central shaft 35 are contra-rotated. Fixedly mounted on the outer tubular shaft 33 at its lower end is a large upper spur gear 60. Attached onto the central shaft below it is a lower spur gear 61, identical to the upper gear 60 except for its smaller bore which fits on the central shaft 35. The gears 60, 61 are driven respectively by upper and lower inward facing racks 62, 63 which, except for their vertical offset, are parallel to each other. Their inward facing teeth engage the upper and lower gears 60, 61 at angular positions 180° removed from each other. As shown by the arrows in FIG. 3, when the racks 62, 63 are driven horizontally to the left, the upper rack 62 rotates the outer shaft 33 in the sense shown by the arrow 64 in the plan view FIG. 2; simultaneously the lower rack 63 drives the central shaft 35 in the sense of rotation shown by the lower arrow 65. This brings the bead deflectors 55 from the central forward position shown in phantom lines in FIG. 2 to the maximum rearward position shown in solid lines.

The frame assembly which holds the racks 62, 63 in their driving mechanism will now be described. Referring to the enlarged view FIG. 3, immediately above the upper gear 60 is an upper frame bushing 67 fitted into an upper frame member 68 seen in plan form in FIG. 4. The upper frame member 68 shown is an elongated plate whose portion above the upper gear 60 is broadened to provide lobes 69 extending sideward beyond the racks 62, 63. From the bushing 67 the plate extends beyond the travel of the racks 62, 63; it terminates in an upturned flange 70 at its right end.

A lower frame bushing 71 is fitted about the lower end of the central shaft 35. Its outer edge is mounted in a lower frame member 72 corresponding in shape to the upper frame member 68 and having at its forward end a downward-turned flange 73. About the bushing 71 the lower frame member is thickened locally to underlie the lower gear 61 and lower rack 63.

Lobes 74 of the lower frame member 72 are supported from the corresponding lobes 69 of the upper frame member 68 by heavy vertical pins 75. The outer surfaces of the racks 62, 63 slide within these pins 75, which resist the tendency of the racks to thrust outward from the gears 60, 61. The upper rack 62 is supported spacedly above the lower frame member by a spacer block 76.

At their forward ends the racks 62, 63 are connected to the outer ends of a rigid diagonally-positioned yoke 77. At its center the yoke 77 is connected to and driven by the piston 79 of a rack-actuating hydraulic cylinder 80 of the "front mounted" type, that is, having a mounting flange 81 at the cylinder end from which the piston 79 projects. Flexible hydraulic conduits 82 connected to both ends of the cylinder 80 permit it to be raised and lowered with the assembly.

Figure 3:
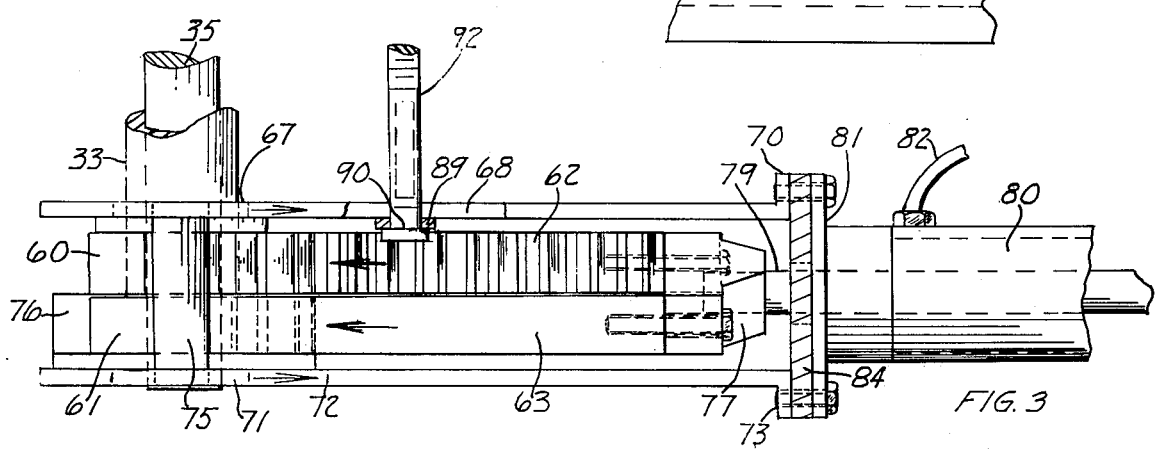
FIG. 3 is an enlarged elevational view of said power drive parts in position prior to rotation.
Figure 5:
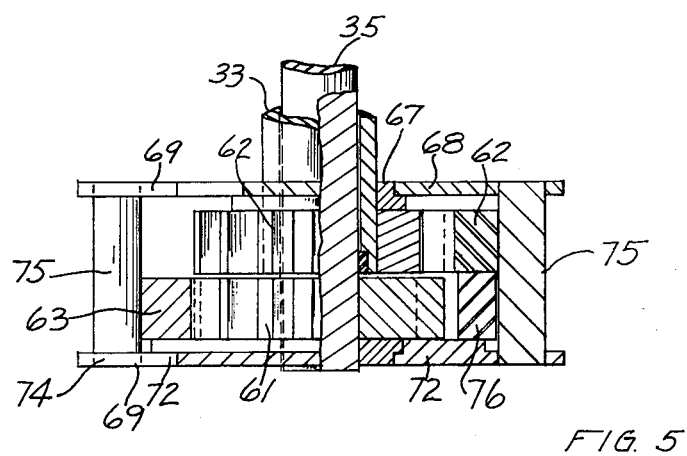
FIG. 5 is a sectional view taken along line 5—5 of FIG. 4.

The upper and lower frame members 68, 72 are connected at their flanged ends 70, 73 by a transverse front plate 84 through which the piston 79 passes. Referring to FIG. 3, the mounting flange 81 of the hydraulic cylinder 80 is bolted to the opposite side of the front plate 84.

As best seen in FIG. 4, the transverse length of the forward plate 84 is such that its outer ends 85 fit loosely between vertical abutment strips 86 welded to the inward extending upper and lower flanges of the I-beams 10. These abutment strips 86 extend downward substantially below the lower flanges of the beams 10, as seen in FIG. 1. Sliding contact against them of the front plate ends 85 permits vertical adjustment of the entire power drive mechanism, as will now be described.

Set within a lift bushing 89 in the upper frame member 68 forwardly of the shafts 33, 35 is the unthreaded flanged end 90 of a lifting screw 92 which extends through the platform plate 20. It is lifted by an internally threaded gear 94, mounted for rotation immediately above the platform and driven by a reversible hydraulic motor 95 as seen in FIGS. 1 and 2. Preferably the lift bushing 89 is so located in the upper frame member 68 as to be near the center of gravity of the entire assembly of those parts which are raised and lowered together within the sleeve 30. A lowered position of this assembly is shown in phantom lines in FIG. 1.

In positions radiating from the sleeve 30 are four diagonally-extending chuck tracks, generally designated 97, which may extend beyond the platform plate 20. The chuck tracks 97 may be formed of pairs of inward-facing channels 98 secured to the upper platform surface and accommodating the lower portions 99 of clamp shoes, generally designated 100, which are narrowed at the level of the upper flanges of the channels 98 to slide therebetween. Each of the shoes 100 has two clamp provisions: a lower horizontal groove 101 terminating in a broad lower projection on which a tire rim may seat; and an upper, slanting groove 102 whose lower member is the upper member of the lower groove and which is topped by an upward slanting clamping face 103, above which is an outward-and-downward sloping guide face 104. This guide face 104 aids in centering the lower flange of a tire rim, guiding it downward for clamping either in the upper grooves 102 or the lower grooves 101.

The clamp shoes 100 are drawn radially inward or outward by rotation of horizontal screw rods 106 centered between the chuck track channels 98. The screw rods 106 pass through female threaded openings in the lower clamp shoe portion between these channels 98. Their outer ends are held centered by supporting plates 107. At their inner ends, shown in FIG. 1, the four screw rods 106 have bevel gears 109 which engage corresponding gears 110 on vertical shafts 111 mounted on the platform plate 20. Sprockets 112 on each of the shafts 111 above the bevel gears 110 are connected by a chain 113 which passes through apertures in the gusset plates 31 and is driven by a hydraulic motor 114.

Prior to mounting a wheel or rim in the clamp shoes 100 of the chucking apparatus described, the outer telescoping arms 51, 52 are removed by sliding radially out of the lower and upper arm sockets 37, 41. Assuming that the rim or wheel to be chucked has a tire mounted on it, the tire is removed using the thrust applying mechanism 14 and the vertical telescoping jack 23. Thereafter, the present invention is used, as follows:

With the arms of vertically adjustable assembly raised above the upper flange of the rim or wheel so chucked in place, and completed by inserting the lower and upper telecoping arms 51, 52, the height of the assembly is adjusted so that the arm outer ends 53 will move in a plane immediately above the upper flange of such wheel or rim. Controls, not shown, operate the reversible hydraulic motor 95 to turn the gear 94 on the lifting screw 92. Inasmuch as its lower flanged end 90 suspends the entire assembly mounted on the frame members 68, 72, 84, the effect of such adjustment is to raise or lower the entire arm rotation assembly including the front mounted hydraulic cylinder 80, the rack 62, 63, gears 60, 61, the concentric shafts 33, 35 and the lower and upper arm assemblies 36, 51, 40, 52. Thus, the contra-rotating assembly may operate at any height throughout the range of adjustment. This permits the machine to be adjusted almost instantaneously to mount tires on rims of different widths.

The effective length of the arm assemblies 36, 51, 40, 52 is adjusted by turning the bolts 57, access being afforded through the windows 46 in the upper arm members 36, 40. At their properly adjusted length, the radially inner surfaces of the bead deflector shoes 55 will pass with clearance about the upper flange of such rim.

To mount a tire, the general procedure may be substantially as set forth in said U.S. Pat. Nos. 3,489,198 and 3,612,140. The tire to be mounted is positioned on top of the rim or wheel, overlapping on the side adjacent to the thrust-applying mechanism 14 and slanting downward toward that side. By controls (not shown) the rack-actuating cylinder 80 is retracted to rotate the bead deflectors 55 to their initial forward position (to the right of FIG. 2, as shown in phantom lines); then, using the thrust-applying mechanism 14, first the lower and then the upper bead is thrust into the drop center of the rim. Such thrust forces the tire mass toward the opposite side (to the left of FIG. 1); then, adjusting and holding the tire so deflected by the thrust mechanism 14, the lower and upper arms 37, 51, 41, 52 are contra-rotated in the direction shown by the arrows 64, 65, so that the sloping bead deflector shoes 55 deflect the beads progressively downward into the drop center of the rim.

If, in passing spacedly about the periphery of the wheel rim, the bead deflector shoes 55 encountered unequal resistance, the rack 62, 63 engaging the gear 60, 61 having the greater torsional resistance would tend to stop (or move less rapidly than the other rack), resulting in a tendency of the rack and piston assembly to twist angularly. To constrain the shafts 33, 35 from unequal rotation arising from such difference in resistance, the transversely elongated front plate 84 is used. Since it is remote from the axis of the sleeve 30, the abutment of one of its ends 85 against an abutment strip 86 overcomes any tendency of the supported elements to twist about the axis of the flange 30.

The bolts 57 permit setting the arm members 36, 40, 51, 52 at precise radial lengths slightly greater than the wheel radii. Since the bead deflectors 55 do not touch the wheel rims the torque requirement of the present invention is only a fraction of that of the prior machine. If the range of radial adjustment provided by the adjusting bolts 57 is insufficient, a second, longer set of outer telescoping arms is used, being otherwise similar to the arms 51, 52.

Another unique feature of construction which reduces stress in the machine is how the front-mounted hydraulic cylinder 80 is utilized without imposing bending loads at the sleeve 30. As seen in FIG. 3, when the hydraulic cylinder 80 is actuated, it exerts a thrust on the two racks represented by the upper and lower arrows pointing to the left. Since the hydraulic cylinder 60 reacts the pressure exerted by its piston 79, it draws the upper and lower frame members 68, 72 to the right, exerting forces on the bushings 67, 71 equal to those exerted by the racks but in the opposite sense, and cancelling them.

In this disclosure, terms of direction such as "vertical" are used in connection with other similar terms for clarity and ease of description. They are to be understood to have suitable equivalent meanings when applied to other embodiments. Since modifications of the invention concepts here disclosed will from the disclosure become obvious to persons skilled in the art, this specification is not to be construed narrowly but rather as coextensive with the disclosed concepts.

We claim:

1. In tire mounting apparatus of the type in which two bead-deflecting arms are rotated simultaneously in opposite senses, the improvement comprising platform means having a fixed vertical sleeve, an outer tubular shaft therein and projecting thereabove and therebelow, and a central shaft within the outer shaft and projecting above and below it, a radial arm secured to the upper end of the central shaft, a second radial arm secured therebeneath to the upper end of the outer shaft, and vertical offset means to position their radially outer arm ends in the same plane, tire bead deflectors secured to said radially outer ends, gears secured on the lower end of the outer shaft and therebeneath on the projecting portion of the central shaft, and means meshing with said gears to drive said shafts in opposite senses.

2. The improvement in tire mounting apparatus defined in claim 1, together with means to constrain the shafts from unequal rotation relative to the platform means, whereby regardless of the difference in resistance encountered by said bead deflectors, said central and outer shafts will be driven angularly at equal rates.

3. The improvement in tire changing apparatus defined in claim 1, in which the means to drive said gears in opposite senses comprises reciprocable rack means including an upper rack engaging the gear on the outer shaft at a point of engagement, and a lower rack engaging the gear on the central shaft at an angular position 180° removed from said point of engagement, together with actuator means to reciprocate the said two racks.

4. The improvement as defined in claim 3, in which the actuator means is a power cylinder, further characterized in having rack-and-actuator support means including an upper frame member having a bushing mounted on the outer shaft above and adjacent to the gear thereon, a lower frame member having a bushing mounted on the central shaft below and adjacent to the gear thereon, and an end member mounting said power cylinder in such position that its piston will drive said racks, whereby, when so driven, the reaction of the cylinder is applied by the bushing of said upper and lower frame members on said shafts adjacent to said gears, thereby avoiding bending moments at the platform sleeve.

5. The improvement as defined in claim 4, together with vertically adjustable means to position, relative to said fixed sleeve, the assembly comprising the said shafts and arms thereon, the lower end gears, the reciprocable rack means, the actuator means, and said support means, whereby to adjust the level of the plane in which the arm ends move.

6. The improvement as defined in claim 5, wherein said vertically adjustable means to position operates between said platform and said rack-and-actuator support means.

7. A tire mounting apparatus comprising

A. platform means having a fixed vertical sleeve bushing therethrough,

B. a vertically adjustable assembly comprising shaft means passing through said sleeve bushing, arm means mounted onto and extending from said shaft means at a level above the upper edge of said sleeve bushing, gear means mounted on said shaft means beneath said platform means and below the lower edge of said sleeve bushing, actuator and gear-drive means, beneath said platform means and engaging said gear means, to rotate said shaft means, said actuator having a vertically-movable connection to a source of power therefor, and frame means mounting said actuator and gear-drive means, together with C. means operable between said frame means and said platform to raise and lower said vertically adjustable assembly whereby to adjust the level of the arm means to accommodate rims of varying width without changing the position of said arm means on said shaft means.

8. Tire mounting apparatus as defined in claim 7, in which the shaft means comprises an outer tubular shaft fitted slidably in said vertical sleeve bushing and projecting thereabove and therebelow, and a central shaft within the outer shaft and projecting above and below it, and in which said arm means comprises a radial arm secured to the upper end of the central shaft, a second radial arm secured therebeneath to the upper end of the outer shaft, and a vertical offset means to position their radially outer arm ends in the same plane, together with tire bead deflectors secured to said radially outer ends, and in which said gear means comprises equal-sized gears secured on the lower end of the outer shaft and therebeneath on the projecting portion of the central shaft, and in which the actuator and gear drive means so engages said gears as to drive said shafts in opposite senses at equal rates of rotation.

* * * * *